3,457,062
METHOD OF FACILITATING THE HARVEST OF MATURE PLANTS
Donald C. Young, Fullerton, Calif., assignor to Union Oil Company of California, Los Angeles, Calif.
No Drawing. Continuation-in-part of application Ser. No. 421,721, Dec. 28, 1964. This application Dec. 13, 1967, Ser. No. 690,058
Int. Cl. A01n 9/36, 9/00, 5/00
U.S. Cl. 71—70                                    8 Claims

ABSTRACT OF THE DISCLOSURE

This invention comprises a method for the defoliation and desiccation of grown plants as an aid to harvesting the plant by the application thereto of an aqueous solution of ammonium nitrate containing a synergistic amount of a specific herbicide which can be a salt or lower alkyl ester of 2,4-dichlorophenoxyacetic acid, or a trialkyl phosphorotrithio ester. The ammonium nitrate is used in concentrations greater than about 7 weight percent and the herbicide is employed in an emulsion with ammonium nitrate solution at concentrations from about 0.01 to about 5.0 weight percent. An emulsifying agent is incorporated to stabilize the emulsion of the organic herbicide in the concentrated ammonium salt solution.

---

This application is a continuation-in-part of parent application Ser. No. 421,721 filed Dec. 28, 1964, and now abandoned.

This invention relates to defoliation and desiccation of grown plants as an aid to harvesting the crop of said plants by providing a premature leaf abscission and/or necrosis.

This invention comprises the use of various intensifiers together with concentrated aqueous solutions of ammonium nitrate, chloride, thiosulfate and mixtures thereof and the application of the mixture to the grown plant in dosages of about 35 to about 250 pounds per acre.

In addition to securing the desired plant regulatory and phytotoxic effect, the ammonium salts are plant nutrients serve to enrich the soil for subsequent crops.

Ammonium salt solutions have been previously suggested for use as defoliants and desiccants; in particular, see U.S. Patent Number 3,152,879 in which the use of the ammonium salts alone or in combination with a surface active agent is disclosed and claimed as defoliants and desiccants. While the use of the aforementioned ammonium salt solutions is quite satisfactory under most circumstances, I have now found that the action of the ammonium salt solutions can be intensified and made more consistent by the incorporation of various herbicides in the ammonium nitrate solution.

The use of the ammonium nitrate solutions as combined defoliants and desiccants has resulted from the recent advances in harvesting machinery, particularly improvements in cotton ginning, which have achieved satisfactory crop harvesting when the plant leaves have been desiccated even though the plant has not been completely defoliated. The application of the concentrated solutions effects defoliation of some of the plant leaves and desiccation of any remaining leaves on the plant. Additionally, the use of intrinsically toxic materials such as pentachlorophenol and magnesium chlorate has fallen into disfavor because of the residual toxic effects on animals and on subsequent plantings.

It is an object of this invention to provide a method to satisfactorily desiccate leaves of growing plants to facilitate harvest of the plant. It is also an object of this invention to obtain a high degree of defoliation in combination with said desiccation.

It is a further object of this invention to provide a harmless composition having little or no residual toxic effects with such defoliation.

Other and related objects will be apparent from the following disclosure.

I have now found that the desiccation and defoliation effect of ammonium nitrate solutions can be intensified and made more consistent by the incorporation of various organic herbicides in the solution. These herbicides are emulsified in the solution with suitable oil-in-water surface active agents set forth in greater detail hereafter. In general, between about 0.1 and about 30 weight percent of the final composition; preferably between about 0.5 and about 5.0 weight percent; comprises the organic herbicide.

The ammonium nitrate solutions useful in my invention are solutions having a concentration greater than about 7 weight percent solute. The maximum concentration is not particularly limiting and even supersaturated solutions that contain suspended solute crystals can be used, it only being important that there be sufficient liquid to adequately distribute the salt on the plant leaves. Generally, solutions or slurries containing from about 15 to about 80 weight percent solute are used with a maximum solids content of the slurries of about 20 weight percent. Preferably, however, the maximum solute content is the salting out concentration of the solution at the ambient temperature to avoid any difficulties in handling a slurry. This maximum concentration is about 65 weight percent ammonium nitrate for most ambient temperatures, about 35 weight percent ammonium thiosulfate, and about 30 weight percent ammonium chloride. The choice of the solution concentration will depend somewhat on the method of application, the most concentrated solutions from about 30 to 80 weight percent being preferred for aerial application where the airplane's capacity generally limits the total volume of solution applied per acre to less than about 15 gallons per acre and frequently to less than 10 gallons per acre. The commercial ground rigs do not have this limited spray capacity and therefore even the more dilute solutions can be effectively applied by these rigs.

The combination of ammonium chloride and nitrate, ammonium thiosulfate and nitrate or ammonium thiosulfate, nitrate and chloride can also be used. Thus about 5 to 25 weight percent ammonium chloride and/or ammonium thiosulfate can be added to the commercially available "20–0–0" ammonium nitrate solution (57 weight percent solute) to provide mixed salt solutions. Other solutions having from 0 to about 30 weight percent ammonium chloride, from 0 to about 55 weight percent ammonium thiosulfate and from about 65 to 0 weight percent ammonium nitrate can be applied to the foliage in accordance with my invention.

Slight amounts of phosphates, preferably ammonium phosphates, can also be incorporated into the solution to impart a flame proofing to the cotton fibers from the harvested crop. Examples of suitable phosphates are mono- and di-ammonium orthophosphates, ammonium pyrophosphate, ammonium tripolyphosphate, etc. The amount of ammonium phosphate can be from about 1 to about 15 weight percent and preferably from about 5 to about 12 weight percent.

The organic herbicides which can be emulsified in the ammonium salt solutions with the emulsifying compound are the alkali metal salts and lower alkyl esters of 2,4-dichlorophenoxyacetic acid or S,S,S-trialkyl phosphortrithioates and the related S,S,S-trialkyl phosphorotrithioites wherein the alkyl group contains from 1 to about 6 carbon atoms. Typical of such materials are trimethyl trithiophosphorotrithioate (DEF), triethyl trithiophosphorotrithioate, tri-n-propyl trithiophosphorotrithioate, tri-n-butyl trithiophosphorotrithioate, tri-sec-butyl trithiophosphorotrithioate, tri-isobutyl trithiophosphorotrithioate, tri-n-amyl trithiophosphorotrithioate, etc.

Also useful as synergists in the ammonium nitrate compositions are the various S,S,S-trialkyl phosphorotrithioites in which the alkyl group contains from 1 to about 6 carbon atoms. Examples of specific thio esters of this class include the trimethyl phosphorotrithioite, triethyl phosphorotrithioite, tripropyl phosphorotrithioite, tributyl phosphorotrithioite, (Merphos), triamyl phosphorotrithioite, tri-sec-butyl phosphorotrithioite, etc.

The 2,4-dichlorophenoxyacetic acid can be employed in the solution, however, the more commonly available esters such as the methyl, ethyl, isopropyl, n-butyl or amyl esters are preferred. Esters of the 2,4-dichlorophenoxyacetic acid and alcohols having from 1 to about 9 carbons can be used. Examples of such alcohols include butoxy ethanol, butoxy ethoxy propanol, isooctanol, propylene glycol, propylene glycol butyl ether, tetrahydrofurfural or related pentanediols. The alkali metal salts, e.g., the sodium, potassium, lithium, etc., 2,4-dichlorophenoxyacetates can also be used as well as the ammonium and organic ammonium salts such as ammonium, dimethyl ammonium, triethyl ammonium, triisopropyl ammonium, tributyl ammonium, triamylammonium, 2,4-dichlorophenoxyacetates. Preferably, the alkyl esters and most preferably the $C_1$-$C_8$ alkyl esters of 2,4-dichlorophenoxyacetic acid are used because of their greater stability in the solution than the salts of the acid.

The aforedescribed herbicides are commonly available in various inert organic solvents such as aromatic hydrocarbon solvents or blends thereof with paraffinic or naphthenic solvents. Examples of such solvents are: kerosene, mineral oil, methylnapthalenes, dimethylnaphthalenes, ethylnaphthalenes, 2-methylpentadiol-1,2,dipropylene glycol methyl ethers, benzene, toluene, aromatic naphthas, xylene, tetralin, cyclohexane, etc. In general, the organic herbicides are present in amounts between about 30 and 90 weight percent of the solution, most commonly in amounts between about 50 and 80 weight percent. The aforedescribed emulsifying agent or agents can be added directly to the organic herbicide solution to prepare a concentrate for addition to the ammonium salt fertilizer solution and additional amounts of any of the aforedescribed organic solvents are added as needed. Preferably, however, an aqueous concentrate emulsion is prepared comprising the organic herbicide, emulsifying agent, their associated organic solvent, and an aqueous solution or water. At the proper ratio of aqueous ingredients to emulsifier, the concentrate has been observed to readily disperse into the ammonium salt solutions with little or no agitation or mixing being required.

The amount of emulsifier employed in my invention depends to some extent on the degree of stability desired. In general, between about 3.5 and about 50 weight percent of the total organic components of the concentrate can comprise the emulsifying agent or agents. Such concentrates, when admixed with the ammonium salt solution, will not separate as indicated by the complete absence of any oil layer even after prolonged storage periods. Emulsifier contents between about 5 and about 15 volume percent of the organic components is the preferred range which provides emulsions showing no cream separation after a storage period of about 7 hours. Formation of a cream layer is to be distinguished from formation of an oil layer since the latter occurs upon complete de-emulsification of the system, whereas, the former is merely the separation of an oil rich emulsion. Even with low concentrations of emulsifier which permit the aforementioned cream separation, complete dispersion of the cream throughout the system is readily achieved by simply stirring the liquid. The normal agitation encountered in the spray tank during application of the composition to the crop will normally provide adequate dispersion of this cream.

Preferably, a surface active agent is added to the ammonium salt solutions to improve its effect in an amount from 0.1 to about 5; preferably from 0.5 to 2 weight percent. I have found that the presence of the surface active agent achieves a more uniform and consistent effect. In general, any surface active agent can be used such as the cationic, anionic and non ionic types.

Examples of the cationic surfactants include: fatty amines, e.g., dodecylamine, octadecylamine (Armeens, Duomeens of Armour Chemical Company); alkarylamines, e.g., dodecyl aniline, fatty amides such as fatty imidazolines, e.g., undecylimidazoline prepared by condensing lauric acid with ethylene diamine or oleylaminodiethylamine prepared by condensing oleic acid with asymmetric diethylene diamine (Sapamine CH by Ciba); quaternary alkyl and aryl ammonium salts and hydrates, e.g., cetyltriethyl ammonium cetyl sulfate, dimethylbenzyldodecyl ammonium chloride, etc.; quaternary ammonium bases of fatty amides of disubstituted diamines, e.g., oleyl methylamino ethylene diethylamine methyl sulfate (Sapamine MS by Ciba), oleylbenzylamino ethylene diethylamine hydrochloride (Sapamine ECH by Ciba); fatty derivatives of benzimidazolines such as are prepared by condensation of a fatty acid with orthophenylenediamine followed by alkylation of the condensate with an alkyl halide to yield an N-alkyl alkylbenzimidazole, e.g., N-methyl N'N'diethyl heptadecylbenzimidazole; N-fatty alkyl pyridinium compounds, e.g., lauryl pyridinium, octadecyl pyridinium (Fixanol of Imperical Chemical Industries), octadecyl methylene pyridinium acetate, etc.

Examples of useful anionic surface active agents include the following: fatty acid glyceride sulfonates and fatty acid sulfonates, e.g., sulfonated cottonseed oil, sulfonated oleic acid, sulfonated sperm oil, sulfonated tallow, etc.; sulfonated fatty amides, e.g., sulfonated amide of ricinoleic acid (Humectol CA by I.G. Farben), sodium salt of sulfuric ester of oleyl diisobutyl amide (Dismulgen V of I.G. Farben), etc.; sulfonated anilides of fats, e.g., sodium salt of sulfuric ester of oleylethyl anilide (Humectol CX by I.G. Farben), etc.; amides of aminosulfonic acids, e.g., sodium sulfonate of oleylmethyl tauride (Igepon T by I.G. Farben); amides from condensation of fatty acid chlorides with amino acids, e.g., sodium salt of oleyl sarcoside (Medialan A by I.G. Farben); sulfonated aromatic hydrocarbons, e.g., benzene sulfonic, naphthalene sulfonic acids and their ammonium and alkali metal salts, etc.; alkylaryl sulfonates, e.g., dodecylbenzene sulfonates, octadecylbenzene sulfonates, etc.

Illustrative non-ionic compounds include the polyethylene oxide condensates with hydrophobic groups having a reactive hydrogen. The hydrophobic group can have from about 10 to 25 carbon atoms and from 2 to about 15 molecular weights of ethylene oxide are commonly condensed per molecular weights of hydrophobic group. The hydrophobic group can be selected from a variety of organic compounds having one or more reactive hydrogens including fatty alkyl or alkenyl alcohols, fatty acids, fatty amines, fatty amide, esterified hexitans or alkyl or alkenyl phenols.

As described, the source of the hydrophilic group is ethylene oxide. Other source materials can be employed, for example, ethylene chlorohydrin, or polyethylene glycol; however, because of its low cost and availability, ethylene oxide is used almost exclusively in the preparation of these materials.

The hydrophobic reactant can comprise an alkyl or alkenyl phenol wherein the alkyl or alkenyl group or groups contain between about 2 and about 16 carbon atoms. Among such compounds are the following: hexyl phenol, hexenyl phenol, hexadecyl phenol, dodecenyl phenols, tetradecyl phenol, heptenyl cresol, octyl and octenyl cresol, lauryl cresol, isoamyl cresol, decyl resorcinol, cetenyl resorcinol, isododecyl phenol, decenyl xylenol, etc. Examples of commercially available wetting agents belonging to this class and having a fatty acid constituent and containing ethylene oxide are the following: "Ninosol 100", "Ninosol 200" and "Ninosol 210" of the Alrose Chemical Company, and "Nopalcol 4–D" of the Nopco Chemical Company.

A third class of hydrophobic reactants comprises the alkyl and alkenyl alcohols containing between about 8 and about 22 carbon atoms. Among such alcohols are dodecanol, tridecanol, tetradecanol, pentadecanol, hexadecanol, heptadecanol, cotadecenol, decosenol, etc. A commercially available wetting agent of this type and containing ethylene oxide is Brij 30 of The Atlas Powder Company.

A fourth class of the hydrophobic reactants comprises long chain alkyl or alkenyl amines or amides containing between about 8 and about 22 carbon atoms. These compounds contain two reactive hydrogens and the polyethylene oxide units are distributed therebetween. Examples of such compounds are dodecanamide, tridecyl amine, tetradecenamide, pentenyl amine, hexadecyl amine, heptadecanamide, octadecyl amine, oleic amide, etc. Examples of commercially available wetting agents in this group containing ethylene oxide are "Ethomide" of The Armour Chemical Company and "Priminox 10" of the Rohm and Haas Chemical Company.

Another class of suitable wetting agents are the reaction products of ethylene oxide with fatty acid partial esters of hexitans. Such compounds are obtained by treating a hexitol, e.g., sorbitol, manitol, dulcitol, etc., with a dehydrating agent to form the corresponding hexitan, i.e., sorbitan, mannitan, dulcitan, etc. The hexitan is then partially esterified with a long chain fatty acid, having between about 8 and about 22 carbon atoms, such as dodecanoic acid, pentadecanoic acid, hexadecanoic acid, oleic acid, stearic acid, etc., to replace one of the reactive hydrogens of the hexitan with the carboxylic radical. The resultant partial ester is then reacted with ethylene oxide. Commercially available compounds of this type are "Tween 65" and "Tween 81" of The Atlas Powder Company.

Very suitable emulsifiers comprise the organic substituted ammonium salts of sulfodicarboxylic acids that are reacted with various hydrophobic groups such as fatty amides having 12 to 18 carbons to prepare half amides in the manner described in 2,976,209, or with fatty amines having 12 to 26 carbons to prepare half amides in the manner described in 2,976,211, or with polyethoxylated fatty amines in the manner described in 3,080,-280, or with fatty acid esters of hydroxyl amines to obtain half amides in the manner described in 2,976,-208.

A preferred emulsifier comprises the amine salts of a sulfodicarboxylic acid half ester of an alkylphenoxy ethoxy alcohol. These emulsifiers have the following structure:

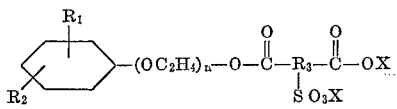

wherein:
  $R_1$ is selected from the class consisting of alkyl and alkenyl groups;
  $R_2$ is selected from the class consisting of hydrogen, alkyl and alkenyl groups;
  $R_3$ is selected from the group consisting of divalent sulfo-alkylene and sulfo-alkenylene groups;
  X is an organic alkyl, aryl and heterocyclic amine cation having from 1 to about 6 carbon atoms;
  $n$ is an integer between about 2 and about 5;
  and the total of carbons in any $R_1$, $R_2$, $R_3$ group is less than about 12; and preferably less than about 6.
Examples of suitable radicals from which $R_1$ and $R_2$ can be selected are the following: methyl, ethyl, propyl, isopropyl, butenyl, isobutyl, amyl, isoamyl, heptenyl, isoheptenyl, octyl, isooctenyl, nonyl, isononyl, decenyl, isodecyl, undecyl, isoundecenyl, dodecyl, isododecyl, etc.

Examples of various $R_3$ groups are the following: methylene, ethylene, propylene, isopropylene, butylene, isobutylene, pentylene, isopentylene, hexylene, isohexylene, etc.

Various organic amine cations can be used for X such as the primary, secondary and tertiary alkyl, alkaryl and aryl amines as well as heterocyclic compounds containing a basic nitrogen. Examples of suitable amines are the following: methylamine, dimethylamine, ethylamine, triethylamine, diethyl benzylamine, propylamine, isopropylamine, diisopropylamine, ethylpropylamine, butylamine, isobutylamine, diisoamylamine, hexylamine, heptylamine, isocetylamine, furanamine, benzylamine, morpholine, pyridine, etc. Preferred are the alkylamines having between 1 and about 6 carbons, e.g., isopropylamine.

Examples of various compounds useful as emulsifiers in my invention are the following: half isobutyl amine salt, half tetraethoxy xylenol ester of sulfo-gluteric acid; half isopropylamine salt, half triethoxy amyl phenol ester of sulfo-adipic acid; half amylamine salt, half pentaethoxy cresol ester of sulfo-pimalic acid; half hexylamine salt, half diethoxyoctyl phenol ester of sulfo-suberic acid; half isopropylamine salt, half diethoxy dodecyl phenol ester of sulfo-azelaic acid, half heptylamine salt, half diethoxy dodecyl phenol ester of sulfo-sebasic acid, etc.

Of the aforedescribed emulsifier compounds, the most preferred are those in which the total of carbons in any $R_1$, $R_2$ or $R_3$ group is less than 4 and the number of carbons in the $R_3$ group is 2 or 3. In this most preferred group, $n$ preferably equals 2.

The aforementioned emulsifiers are readily prepared by reacting at about 100° C. an unsaturated acid anhydride, e.g., maleic anhydride with a hydrophobic group comprising polyethylene oxide condensate on an alkylphenol. The resultant half ester is then reacted with an organic amine to prepare the salt which is reacted in an alcohol or aqueous media at 60°–85° C. with an amine bisulfide to add the amine sulfonate group to the olefinic bond of the discarboxylic acid. The aforementioned emulsifiers are also available from the Witco Chemical Company under Emcol H2A designation.

The invention can be applied to a wide variety of crops to facilitate their harvesting such as cotton, potatoes, sugar beets, sugar cane, peppers, milo, roses, alfalfa, tomatoes, grapes, pineapple, etc.

The following illustrative compositions will illustrate my invention:

The following compositions will illustrate combinations of organic herbicides and ammonium salt solutions which, in accordance with my invention, are applied to the foliage of plants to facilitate the harvesting of the plants by providing a premature leaf necrosis or abscission.

COMPOSITION 1

Ammonium nitrate _____weight percent__ 57
Methyl 2,4-dichlorophenoxy acetate _____do____ 3
Emcol H2A (percent of organic
  portion) _____volume percent__ 15

COMPOSITION 2

Ammonium nitrate _____weight percent__ 45
Ammonium chloride _____do____ 10
Isopropyl 2,4-dichlorophenoxy acetate _____do____ 10
Dismulgan V (percent of organic
  portion) _____volume percent)__ 5

COMPOSITION 3

Ammonium sulfate _____weight percent__ 65
S,S,S-tri-sec-butyl phosphorotrithioate _____do____ 12
Antarax A-201 (percent of organic
  portion) _____volume percent__ 3

COMPOSITION 4

| | | |
|---|---|---|
| Ammonium nitrate | weight percent | 25 |
| S,S,S-tri-ethyl phosphorotrithioite | do | 20 |
| Brij 30 (percent of organic portion) | volume percent | 15 |

COMPOSITION 5

| | | |
|---|---|---|
| Ammonium nitrate | weight percent | 35 |
| Ammonium thiosulfate | do | 15 |
| S,S,S-tri-methyl phosphorotrithioate | do | 15 |
| Tween 65 (percent of organic portion) | volume percent | 5 |

COMPOSITION 6

| | | |
|---|---|---|
| Ammonium nitrate | weight percent | 60 |
| S,S,S-tri-hexyl phosphorotrithioate | do | 25 |
| Ethomide (percent of organic portion) | volume percent | 15 |

COMPOSITION 7

| | | |
|---|---|---|
| Ammonium nitrate | weight percent | 70 |
| Sodium 2,4-dichlorophenoxy acetate | do | 15 |
| Igepon T (percent of organic portion) | volume percent | 4 |

The following examples will illustrate a mode of practice of the invention and demonstrate the synergistic results obtainable thereby:

Example 1

The effect of the 2,4-dichlorophenoxyacetic acid herbicides on the desiccation and defoliation of cotton was determined on field cotton plants varying in height from approximately 30 to 48 inches. The cotton was of harvesting maturity at the time of application of the solutions which were sprayed from a hand-pushed rig equipped with five 65° T-jet nozzles. The rig had upright standards and an overhead yoke that straddled the cotton row and the five nozzles were placed on the rig to direct their spray to the center thereby forming a five-pointed star spray pattern about the cotton plants.

The test solutions applied at a rate of 10 and 20 gallons per cotton acre and the cotton was observed for combined defoliation and desiccation after 24 hours and after one week. The following data were obtained from a test of ammonium nitrate, ammonium nitrate plus the preferred emulsifier and ammonium nitrate with an organic herbicide, 2,4-dichlorophenoxyacetic acid (2,4-D):

| Solution | Application rate | Percent Effectiveness 24 hours | Percent Effectiveness 1 week |
|---|---|---|---|
| (1) 57 percent ammonium nitrate | 10 gal./acre | 50 | 40 |
| (2) 57 percent ammonium nitrate | 20 gal./acre | 80 | 80 |
| (3) 57 percent ammonium nitrate, 0.5% Emcol H2A | 10 gal./acre | 20 | 50 |
| (4) 57 percent ammonium nitrate, 0.5% Emcol H2A | 20 gal./acre | 80 | 80 |
| (5) 57 percent ammonium nitrate: | | | |
| 0.5% Emcol H2A | 10 gal./acre | 30 | 80 |
| 1.6% 2,4-D | 20 gal./acre | 70 | 90 |
| (6) Commercial magnesium chlorate | 2 lbs./acre | 0 | 0 |

The experiment was repeated on mature Deltapine cotton using an emulsion containing 0.27 weight percent of the propylene glycol monobutyl ether ester of 2,4-dichlorophenoxyacetic acid in a solution of 8 weight percent ammonium nitrate containing 0.8 weight percent of an oil-in-water emulsifier. An emulsion of 0.27 weight percent of the herbicide in water and a solution of 8 weight percent ammonium nitrate were also applied to separate test plots of cotton.

The test materials were applied to the cotton at three dosage levels; 5, 10 and 45 gallons per acre and the cotton was observed for the combined defoliation and desiccation 13 days after the application.

The following table summarizes the results:

| Material | Application rate | Percent effectiveness |
|---|---|---|
| (1) 8.0 percent ammonium nitrate, 0.8 percent emulsifier. | 5 gal/acre | 20 |
| | 15 gal/acre | 25 |
| | 45 gal/acre | 60 |
| (2) 0.27 percent 2,4-D ester, 0.8 percent emulsifier. | 5 gal/acre | 45 |
| | 15 gal/acre | 50 |
| | 45 gal/acre | 75 |
| (3) 8.0 percent ammonium nitrate, 0.8 percent emulsifier, 0.27 percent 2,4-D ester. | 5 gal/acre | 80 |
| | 15 gal/acre | 95 |
| | 45 gal/acre | 95 |

The preceding data evidence synergism between the herbicide and ammonium salt solution. The additive effectiveness of the two components for the application rates of 5, 15 and 45 gallons per acre are 51, 62 and 90 percent, respectively. The actual data yielded considerably higher results, particularly at the more sensitive lower application rates of 5 and 15 gallons per acre.

Substantially the same results are obtained when an equivalent weight of the acid, 2,4-dichlorophenoxyacetic acid or its alkali metal salts are substituted for the ester of 2,4-dichlorophenoxyacetic acid used in the preceding example.

Example 2

The effect on desiccation of mature Acala cotton of the phosphorus thioesters was determined using a commercially available material, DEF, S,S,S-tributyl phosphorotrithioate, alone, and in emulsion with an ammonium nitrate solution. The ammonium nitrate solution was commercially available Leaf-Dry having the following composition:

| | Weight percent |
|---|---|
| Ammonium nitrate | 44.6 |
| Ammonium thiosulfate | 11.0 |
| Ammonium orthophosphate | 0.5 |
| Emulsifier | 1.0 |
| Water | Balance |

The Leaf-Dry composition was applied at two dosages; 20 and 10 gallons per acre with sufficient water added to provide 30 gallons total spray per acre. The organic herbicide, DEF, was emulsified in water at the concentration of one quart in 30 gallons of water and the emulsion was applied at a rate of 30 gallons per acre in accordance with the manufacturer's instructions.

The organic herbicide, DEF, was also emulsified in Leaf-Dry at a concentration of one pint per 10 gallons Leaf-Dry and the emulsion was diluted with water and applied at the rate of 30 gallons spray per acre. The cotton was observed for defoliation and desiccation after 6 days and the following table summarizes the results:

| Material | Application rate | Percent defol. | Effectiveness Desicc. | Effectiveness Total |
|---|---|---|---|---|
| (1) Leaf-Dry | 20 gal./acre | 30 | 90 | 93 |
| (2) Leaf-Dry | 10 gal./acre | 20 | 30 | 41 |
| (3) S,S,S-tributylphosphorotrithioate. | 1 quart/acre | 30 | 40 | 58 |
| (4) Leaf-Dry plus S,S,S-tributylphosphorotrithioate. | 10 gal./acre / 1 pint/acre | 70 | 90 | 97 |

The results evidence synergism between the individual components since the additive effect should have been 41 percent defoliation and 54 percent desiccation with a total effectiveness of 73 percent. In contrast, the observed values were 70, 90 and 97 percent, respectively. In addition, this synergism was observed even though the dosage of the organic herbicide was halved to 1 pint per acre.

Substantially the same results are obtained when the organic herbicide is replaced with an equivalent weight of other herbicides such as S,S,S-trimethyl phosphorotrithioate or S,S,S-tributyl phosphorotrithioite (Merphos).

Example 3

The combination of Leaf-Dry and DEF was also tested for synergism on alfalfa. The same concentrations of active ingredients used in Example 2 were repeated in the test on alfalfa and the following results on desiccation were observed:

| Material | Application rate | Percent effectiveness | | |
|---|---|---|---|---|
| | | Defol. | Desicc. | Total |
| (1) Leaf-Dry | 20 gal./acre | 50 | 70 | 85 |
| (2) Leaf-Dry | 10 gal./acre | 30 | 50 | 65 |
| (3) S,S,S-tributyl phosphorotrithioate. | 1 quart/acre | 20 | 50 | 60 |
| (4) Leaf Dry plus S,S,S-tributyl phosphorotrithioate. | {10 gal./acre, 1 pint/acre} | 70 | 80 | 94 |

Again, synergism was observed since the additive effect of treatments 2 and 3 should have been 46 percent defoliation, 75 percent desiccation for a total effectiveness of 86 percent, considerably less than the observed results.

The preceding examples are intended solely to illustrate my invention and set forth the mode of practice thereof. It is not intended that this exemplification be unduly limiting of the invention but rather that the invention be defined by the steps and ingredients and their obvious equivalents set forth in the following claims.

I claim:

1. The method of facilitating the harvest of mature plants which comprises applying an aqueous salt composition to the foliage of said plants at a dosage greater than about 35 pounds of said aqueous salt composition per acre, said composition comprising: (a) water containing at least about 7 weight percent of ammonium nitrate, (b) from 0.1 to about 5.0 weight percent of an organic herbicide selected from the class consisting of the alkali metal salts and alkyl esters of 2,4-dichlorophenoxyacetic acid; the S,S,S-trialkyl phosphorotrithioates and the S,S,S-trialkyl phosphorotrithioites, wherein the alkyl group has from 1 to about 5 carbons; and (c) an oil-in-water emulsifier in an amount from 3.5 to about 50 weight percent of said herbicide, sufficient to emulsify said herbicide in said aqueous composition.

2. The method of claim 1 wherein said herbicide is an alkyl ester of 2,4-dichlorophenoxyacetic acid.

3. The method of claim 1 wherein said solution contains between 20 and 65 weight percent ammonium nitrate.

4. The method of claim 1 wherein said solution also contains from 0 to 30 percent ammonium chloride.

5. The method of claim 1 wherein said herbicide is an S,S,S-trialkyl phosphorotrithioate.

6. The method of claim 1 wherein said herbicide is an S,S,S-trialkyl phosphorotrithioite.

7. The method of claim 1 wherein said plants are cotton.

8. The method of claim 1 wherein said composition also contains from 0 to about 55 percent ammonium thiosulfate.

References Cited

UNITED STATES PATENTS

| 2,390,941 | 12/1945 | Jones | 167—45 |
| 2,955,803 | 10/1960 | Goyette | 71—2.3 |
| 2,965,467 | 12/1960 | Markley | 71—2.7 |
| 2,979,391 | 4/1961 | Markley | 71—2.7 |
| 3,006,752 | 10/1961 | Goodhue | 71—2.7 |
| 3,152,879 | 10/1964 | Yale | 71—2.2 |

OTHER REFERENCES

Federal Register, vol. 30, 1965, p. 9002.

LEWIS GOTTS, Primary Examiner
C. L. MILLS, Assistant Examiner

U.S. Cl. X.R.

71—71, 80